United States Patent [19]

Mach

[11] Patent Number: 4,617,886

[45] Date of Patent: Oct. 21, 1986

[54] ROTARY ENGINE

[76] Inventor: Stanley R. Mach, 1201 NW. 87th Way, Pembroke Pines, Fla. 33024

[21] Appl. No.: 703,138

[22] Filed: Feb. 19, 1985

[51] Int. Cl.[4] ............................................. F02B 53/00
[52] U.S. Cl. ................................................... 123/223
[58] Field of Search .................. 123/44 D, 223, 227, 123/231

[56] References Cited

U.S. PATENT DOCUMENTS 3,429,301  2/1969  Sandidge ............................. 123/227
3,596,641  8/1971  Hofmann ............................. 123/227

FOREIGN PATENT DOCUMENTS 843183  7/1952  Fed. Rep. of Germany ...... 123/223

Primary Examiner—Michael Koozo
Attorney, Agent, or Firm—John H. Faro

[57] ABSTRACT

Disclosed is a rotary internal combustion engine having a generally circular geometry in vertical cross section. The engine's rotor is circular, and it is disposed in a housing in two portions, each portion being a section of a different circle, the circles being offset along the engine's vertical centerline. One of these circles is identical in center and radius as the rotor. The other, owing to the displacement between its center and the center of rotation of the rotor, has a gap between it and the rotor. The engine's crank shaft rotates about an axis passing through the center of this second circle. The rotor has a plurality of radially extending holes connected by connecting rods from the crank shaft, each connecting rod having attached to it a sealing means making the holes effective as combustion chambers. This improved engine is unique in the design of the individual combustion chambers and pistons which undergo reciprocal movement within said chambers. The cooperative relationship of these pistons and connecting rods attached thereto affords the ability of the rotor to transition from the compression cycle to the power cycle essentially free from the sealing problems commonly encountered in engines of this design.

1 Claim, 3 Drawing Figures

ROTARY ENGINE

BACKGROUND OF THE INVENTION

Present rotary internal combustion engines have combustion chambers that are noncircular, an example of which is the Wankel engine that typically uses an ellipsoidal housing to encase its combustion chambers. For such an engine's rotor to form a gas tight combustion chamber with the housing, the tolerances of the rotor and housing, as well as the seals therebetween, must be very small, and thus it is difficult and expensive to machine such engines. Also, these engines do not fully exhaust combustion gases from their combustion chambers, resulting in incomplete burning of fuel during subsequent combustion cycles.

Moreover, such engines have an inherent inefficiency because the force released by burning fuel impinges upon the engine's rotor all along the radius between the engine's crank shaft and the outermost extremity of the rotor. Gas impinging upon the rotor closer to the crank shaft exerts less torque than that distant from the crank shaft, and much of the energy released in combustion cannot contribute to the torque on the crank shaft, wasting considerable energy, and making the engine more difficult to cool because this excess energy must be removed. The extra cooling capacity necessitated by this wasted energy causes a further decrease in energy efficiency because the energy to operate this larger cooling system is expended to carry off heat that has served no useful purpose.

SUMMARY OF THE INVENTION

Accordingly, it is an object of this invention to provide a rotary engine that is easier and less expensive to produce.

It is a further object of this invention to produce such an ingine having moving parts that have circular geometry, and the therefore easier to machine and seal.

It is a further object of this invention to increase combustion efficiency and reduce the overall load on the engine by removing virtually all combustion products at the end of each combustion cycle.

It is a further object of this invention to decrease the load on the engine's cooling system and further increase the efficiency of the combustion cycle by using waste heat to preheat gases during the intake and compression portions of the combustion cycle.

In accordance with these and other objects that shall become apparent hereinafter, there is disclosed a rotary internal combustion engine having a circular rotor disposed in a housing formed by two sections of circles having different radii and centers. One of these circular sections has the same radius and center as the rotor, and is disposed flush against and sealed to the rotor. The other portion rotates about an axis offset from the axis of rotation of the rotor, so that as the rotor rotates past this offset section a gap forms between the rotor and the housing. The rotor has a plurality of radially extending holes into each of which extends a radial connecting rod from the crankshaft, and a connecting rod follower. The rod, follower, and hole together form a combustion chamber.

Because the centers of rotation of the crank shaft and the rotor are different, as any of the openings rotate through a combustion cycle the connecting rod follower is pulled back and forth radially by the connecting rod, first creating a volume in the combustion openings into which fuel gases are injected, then compressing these gases for ignition. The gap between the rotor and the housing opens immediately adjacent the engine's spark plug so that it can receive combustion gases, this gap opening also to the atmosphere so that these gases may exhaust. The connecting rod follower acts as a pump to force virtually all the combustion gases out of the engine, so that these gases do not remain in the combustion chamber to hinder subsequent fuel burning. The combustion chambers themselves compress the fuel gases immediately adjacent the radial extremity of each connecting rod, so that the full force of each ignition is directed against this extremity, thus maximizing torque generated on the crank shaft.

The instant invention will be more fully understood from the following detailed description, it being understood, however, that the invention is capable of extended application, and is not confined to the precise disclosure. Changes and modifications may be made that do not affect the spirit of the invention, nor exceed the scope thereof, as expressed in the appended claims. Accordingly, this invention will be described with reference to the accompanying drawings.

DETAILED DESCRIPTION OF THE PREFERRED EMBODIMENT

Figure 1:
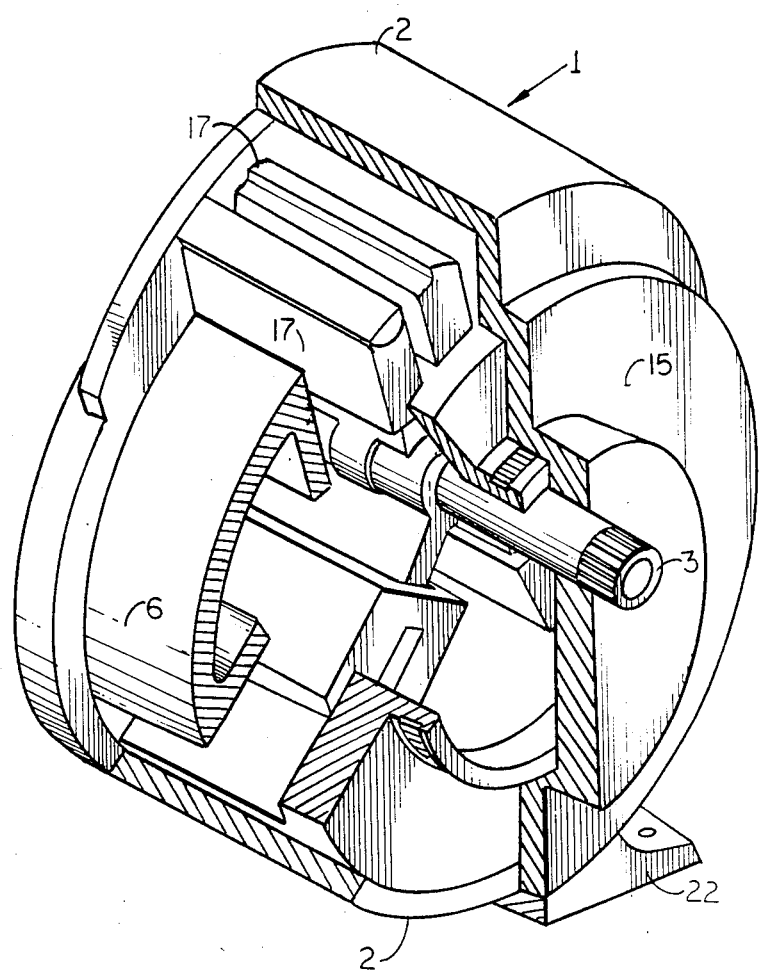
FIG. 1 is a top perspective view of the engine disclosed in this application, with portions of the engine broken away to illustrate selected internal components.

With reference to the drawing Figures, and in particular FIG. 1, there is shown a rotary engine 1 mounted on base or pedestal 22. Engine 1 has a shell comprised of outer housing 22 and housing cover 15. Within this shell is a rotor 6 rotatably attached to crank shaft 3.

Figure 2:
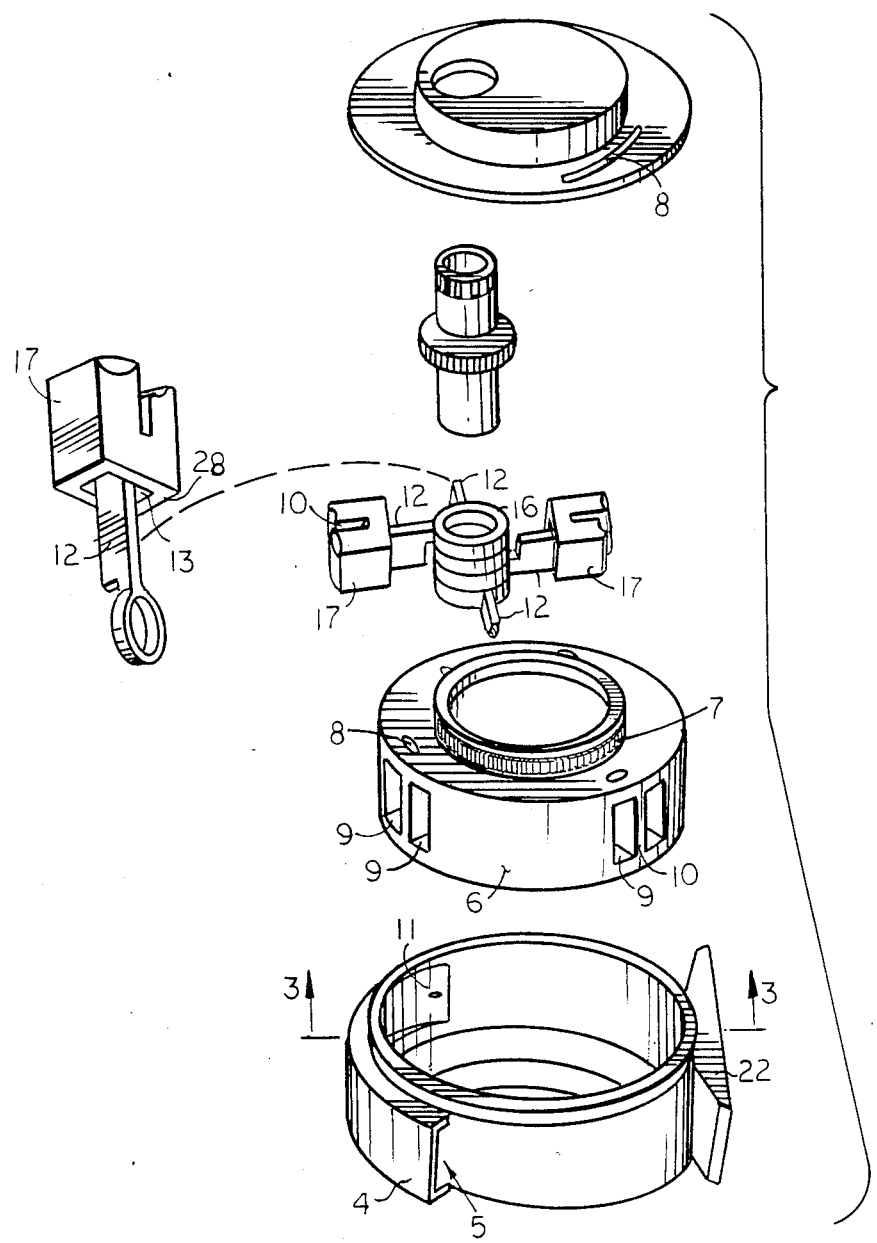
FIG. 2 is an exploded view of the engine.

With particular reference to FIG. 2, it is seen that rotor 6 is mounted within rotor housing 4 for rotation on bearings 7. Rotor 6 has a plurality of radially disposed combustion chambers 9 for receiving a plurality of connecting rod followers 17. Followers 17 are inserted within combustion chambers 9 so that unitary portion 10 of rotor 6 locates within mating recess 10' of follower 17. Housing 4, connecting rod followers 17, and rotor 6 together form the combustion chambers 9 of the engine, and the number of followers 17 corresponds functionally to the number of pistons in a conventional internal combustion engine. Connecting rod follower 17 is fixed to connecting rod 12 and ring 16 for rotation with crank shaft 3. Housings 4 and 15, and rotor 6, have various openings 8, 8', 8'', which are gas input ports to members 17, e.g. from a carburetor, for injecting gases to be burned in engine 1.

Figure 3:
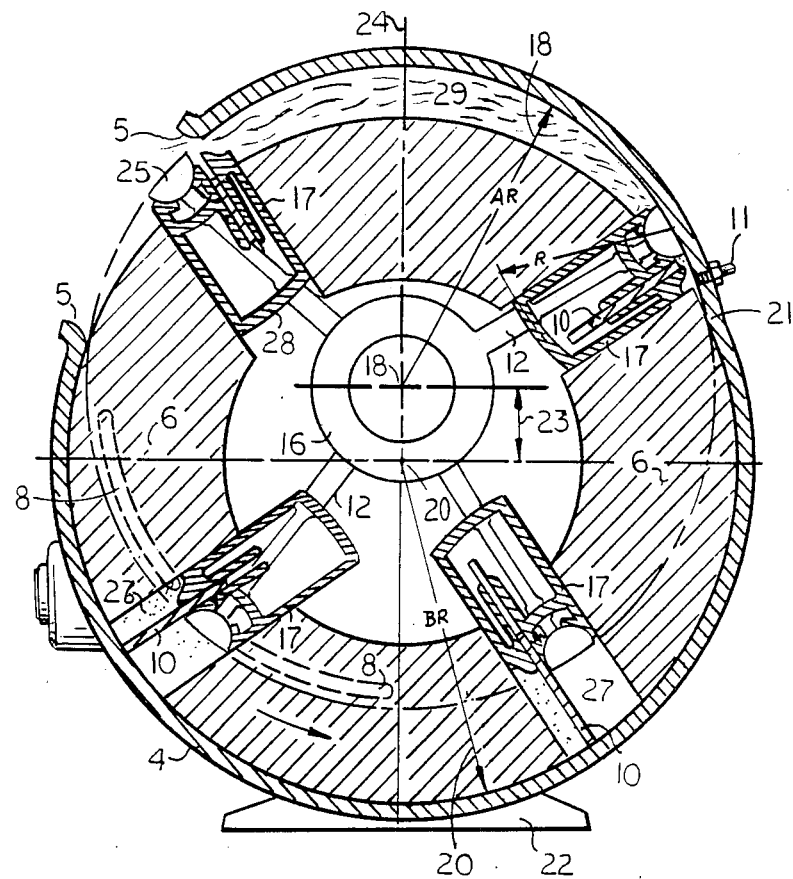
FIG. 3 is a cross sectional view of an assembled and operating engine, the cross sectional cut taken in the direction of lines 3—3 of FIG. 2.

With particular reference to FIG. 3, the operation of engine 1 can be seen. Rotor 6 is circular having a radius 20 and a center of rotation at 21. Rotor housing 4 has two different circular circuit portions, which meet at points 5' and 21. The lower of these portions has the same radius and center as does rotor 6. The other of these portions has radius 18 centered at 18'. Centers of rotation 18' and 20' are offset by distance 23 along vertical centerline 24 of engine 1. Note that center 18' of the housing section defined by 18, and center 20'' of rotor 6 and the housing section defined by 20, is each located on vertical centerline 24 of engine 1. This results in both of these sections of housing 4 being symmetrically disposed about centerline 24.

In this embodiment, rotor 6 has disposed within it four combustion chambers 9, each chamber being formed by the walls of rotor 6 and the follower 17 disposed in the opening. Portion 10 of rotor 6 acts as a partition to divide each combustion chamber 9 into a pair of subchambers 26, 27, each being rendered airtight by the cooperation of the radial termination 25 of connecting rod 12, bearing seals 20, and follower 17. To illustrate the engine's operation, the workings of a single combustion chamber 9 will be described as the chamber passes through a complete combustion cycle. The cycle's intake portion begins as combustion chamber 9 passes 5' (chamber 9 in rotor 6 rotates counterclockwise.)

Because the center of rotor 6 and the axis of rotation of crankshaft 3 are offset by distance 23, connecting rod 12 and connecting rod follower 17 will move radially back and forth within combustion chamber 9 as rotor 6 circles within housing 4. The radius of curvature of connecting rod termination 25, its bearing seat 20, base portion 28 of follower 17, etc., are chosen with respect to distance 23 so that connecting rod 12 rocks smoothly back and forth as rotor 6 progresses through 360 degrees in housing 4. As combustion chamber 9 passes point 5' in housing 4, connecting rod 12 begins to pull rod follower 17 radially inwardly, opening spaces 26, 27 in combustion chambers 9. As chambers 26, 27 sequentially pass intake port 8, 8' space 26 is loaded with fuel (e.g. carbureted gasoline) and thereafter space 27 is loaded with air, each by staggered intake ports 8, 8' disposed on opposite sides of rotor 6. Because of partition 10 and seal 20, there is as yet no fluid communication between subchambers 26 and 27.

As rotor 6 continues to move counterclockwise, the relatively cool gases in combustion subchambers 26, 27 absorb combustion heat from housing 4, thus reducing the auxilary cooling needs of engine 1, and preheating the gases. As the combustion chambers move through the compression portion of the cycle, offset 23 causes connecting rod 12 and connecting rod follower 17 to move radially outwardly in combustion chamber 9, drastically reducing the volume of subchambers 26, 27 and compressing the gases therein. As the combustion chamber reaches the point 21 of housing 4, housing 4's larger radius of curvature 18 causes partition portion 10 of rotor 6 to lose sealing contact with housing 4, thus opening gap 29 and connecting subchambers 26 and 27 fluidically. Termination 25 can also have pin-holes to improve fluid communication between subchambers 26 and 27. Spark plug 11 fires the fuel air mixture in subchamber 26 placing a large transverse force on termination 25 (i.e. a large torque on crank shaft 3), and causing connecting rod 12 and crank shaft 3 to rotate counterclockwise. Exhaust gases from this combustion locate in chamber 29 between rotor 6 and housing 4, and these gases are forced out through an exhaust port extending between points 5 and 5' by the counterclockwise movement of termination 25 and follower 17. In so doing, virtually all of the exhaust gases are expelled before the combustion chamber begins the intake portions of another cycle, resulting in much more efficient fuel combustion. Additionally, because ignition occurs only at the extreme termination 25 of connecting rod 12, virtually all the force released in such an ignition is directed transversely to arm 12 at its radial extremity, thus maximizing the torque on crank shaft 3. This makes engine 1 particularly fuel efficient.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a rotary combustion engine having
   (i) a circular rotor disposed within a rotor chamber of a rotary engine housing, said rotor chamber formed of two sections of overlapping circles having different radii and centers, one of said circular sections having essentially the same radius and center as that of the rotor and the other of said circular sections having a center axis which is offset from the center axis of the rotor,
   (ii) a plurality of reciprocating pistons radially positioned within cylinders which extend from the periphery of the surface of the rotor, and
   (iii) a plurality of connecting rods each of which being connected to a piston on one end thereof and to a crank shaft of the engine on the other end thereof, the crankshaft being concentric with other of said circular sections, the improvement comprising: a rotor having plurality combustion chambers which radially extend from the surface of the rotor inward toward said centrally located crank shaft, each of said combustion chambers being at least partially divided by a portion of the rotor which extends inward from the rotor surface into the combustion chamber, thereby partially partitioning the combustion chamber into a forward compartment and a rearward compartment;

a plurality of pistons adapted for reciprocal motion within said combustion chambers, each of said pistons being further adapted for reciprocal movement within both the forward and rearward compartments of the combustion chamber and provided with means for cooperative engagement to a connecting rod; and a plurality of connecting rods, each of which being adapted for engaging said pistons and thereby providing reciprocal movement thereof within the combustion chamber, each of said connecting rods extending from its point of engagement of the piston, through the top of the piston and into the forward compartment of the combustion chamber, the portion of said connecting rod extending above the top of the piston being adapted to sealingly engage the surface of the other of said circular sections of said rotor chamber so as to form a gas tight seal therebetween prior to ignition of an air fuel mixture in the rearward compartment of the combustion chamber.

* * * * *